United States Patent
Gu

(10) Patent No.: US 10,182,043 B2
(45) Date of Patent: Jan. 15, 2019

(54) METHODS AND SYSTEM FOR USER AND DEVICE MANAGEMENT OF AN IOT NETWORK

(71) Applicant: CYBROOK INC., Santa Clara, CA (US)

(72) Inventor: Qunshan Gu, Santa Clara, CA (US)

(73) Assignee: CYBROOK INC., Santa Clara, CA (US)

(*) Notice: Subject to any disclaimer, the term of this patent is extended or adjusted under 35 U.S.C. 154(b) by 18 days.

(21) Appl. No.: 14/802,098

(22) Filed: Jul. 17, 2015

(65) Prior Publication Data

US 2017/0019390 A1    Jan. 19, 2017

(51) Int. Cl.
| | |
|---|---|
| *H04L 29/06* | (2006.01) |
| *H04L 29/08* | (2006.01) |
| *H04W 12/08* | (2009.01) |
| *H04W 4/70* | (2018.01) |

(52) U.S. Cl.
CPC .............. *H04L 63/08* (2013.01); *H04L 67/12* (2013.01); *H04W 4/70* (2018.02); *H04W 12/08* (2013.01)

(58) Field of Classification Search
CPC ....................................................... H04L 63/08
USPC ............................................................. 726/5
See application file for complete search history.

(56) References Cited

U.S. PATENT DOCUMENTS

| | | | |
|---|---|---|---|
| 9,444,624 B2* | 9/2016 | Brill ........................ | H04L 9/321 |
| 9,686,682 B2* | 6/2017 | Kim ...................... | H04W 12/06 |
| 2008/0005282 A1* | 1/2008 | Gaedcke ........... | G06F 17/30867 |
| | | | 709/219 |
| 2008/0201767 A1* | 8/2008 | Williams ................ | G06F 21/31 |
| | | | 726/6 |
| 2012/0011233 A1* | 1/2012 | Dixon ................. | H04L 65/1073 |
| | | | 709/221 |
| 2012/0254362 A1* | 10/2012 | Li .......................... | H04W 4/025 |
| | | | 709/218 |
| 2013/0060869 A1* | 3/2013 | Davis .................. | G06Q 10/107 |
| | | | 709/206 |
| 2013/0135675 A1* | 5/2013 | Hashimoto .......... | H04N 1/0097 |
| | | | 358/1.15 |
| 2013/0290234 A1* | 10/2013 | Harris .................... | G06N 5/022 |
| | | | 706/46 |
| 2014/0165178 A1* | 6/2014 | Perrone, II .......... | H04L 63/0892 |
| | | | 726/9 |

(Continued)

*Primary Examiner* — Peter C Shaw
(74) *Attorney, Agent, or Firm* — Young Basile Hanlon & MacFarlane, P.C.

(57) ABSTRACT

Method for connecting multiple devices associated with an Internet of Things (IoT) network is provided. The method includes the steps of associating a first device identifier of a first device with a first account name and a second device identifier of at least a second device with a second account name, where each device is associated with at least one device identifier for each account name, authenticating each device with a server associated with the IoT network using the corresponding account name and the associated device identifier, determining whether the first account name and the second account name belong to the same group in response to authenticating the first device and the second device and connecting the first device and the second device for management and information exchange based on the determination whether the first and second account names belong to the same group.

18 Claims, 6 Drawing Sheets

(56) References Cited

U.S. PATENT DOCUMENTS

| | | | |
|---|---|---|---|
| 2014/0324973 A1* | 10/2014 | Goel | H04L 12/2803 709/204 |
| 2015/0007273 A1* | 1/2015 | Lin | H04L 63/08 726/4 |
| 2015/0019710 A1* | 1/2015 | Shaashua | H04W 4/70 709/224 |
| 2015/0242911 A1* | 8/2015 | Zises | G06Q 30/0267 705/14.64 |
| 2016/0182497 A1* | 6/2016 | Smith | H04L 63/0853 713/156 |
| 2017/0063927 A1* | 3/2017 | Schultz | H04L 63/20 |

* cited by examiner

METHODS AND SYSTEM FOR USER AND DEVICE MANAGEMENT OF AN IOT NETWORK

FIELD

This disclosure generally relates to user and device management of an Internet of Things (IoT) network and more specifically to methods and systems for management of users and devices in an IoT network.

BACKGROUND

Internet of Things (IoT) includes a network of connected devices, which can offer advanced connectivity of devices, systems and services. The devices are used to sense, receive, transmit information as well as communicate with other devices, networks, or computers.

SUMMARY

The current disclosure provides a method and system for user and device management of an IoT network. The design disclosed herein may also be adapted to provide management of individuals in a social network, or in a combined social and IoT network.

In one aspect, a method for connecting multiple devices associated with an Internet of Things (IoT) network is provided. The method includes the steps of associating a first device identifier of a first device with a first account name and a second device identifier of at least a second device with a second account name, where each device is associated with at least one device identifier for each account name, authenticating each device with a server associated with the IoT network using the corresponding account name and the associated device identifier, determining whether the first account name and the second account name belong to the same group in response to authenticating the first device and the second device and connecting the first device and the second device for management and information exchange based on the determination whether the first and second account names belong to the same group.

In another aspect, a system for connecting multiple devices associated with an Internet of Things (IoT) network is provided. The system includes a first device with a first account name associated with a first device identifier, at least a second device with a second account name associated with a second device identifier, where each device is associated with at least one device identifier for each account name, and the second device is connected to the first device for management and information exchange based on a determination that the first and second account names belong to the same group a server associated with the IoT network, where the server authenticates each device using the corresponding account name and the associated device identifier prior to connecting the first and second devices.

DETAILED DESCRIPTION

Figure 1:
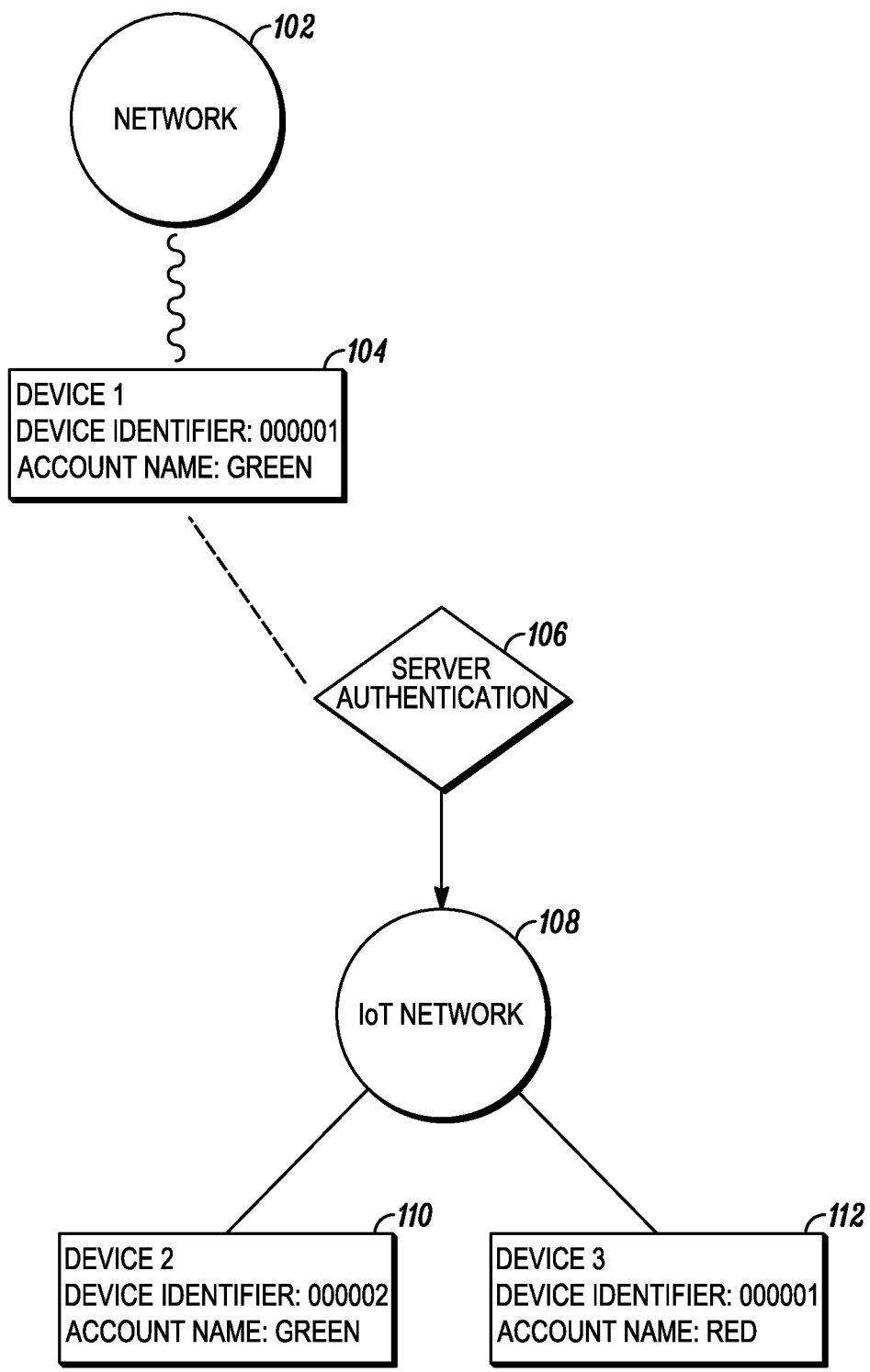
FIG. 1 illustrates a device 104 which is attempting to initiate authentication (i.e., logging on) with server 106 connected to IoT network 108 according to an implementation.

The Internet is a world-wide system of computer networks and computers which communicate via a standard Internet protocol suite such as, for example, TCP, (i.e., Transmission Control Protocol) and IP (i.e., Internet Protocol). The Internet of Things ("IoT") includes devices which sense, receive, or transmit information as well as communicate with other devices, networks or computers. Each device in an IoT network may be uniquely designated by an identifier such as, for example, a radio frequency identifier, or an address. An IoT network can include devices such as sensors, actuators, cell phones, appliances, and other devices that can be connected.

IoT networks, because of the large number of connected devices, often lack the security of a login mechanism of a central server, which is typically used to manage interconnection in media systems such as video, audio and messenger and are also frequently isolated from social networks. Implementations of the current disclosure describe methods and systems for authenticating devices with a server using an account name that allows for communication between devices. The same account name can be associated with any number of device identifiers and may also be used for social networking applications, thus providing a network that can include social networking and IoT connectivity functionalities simultaneously. Multiple devices associated with the same account can be logged onto the server regardless of how many devices are associated with the same account name.

Furthermore, devices and their interconnectivity (i.e., connectivity with other devices) can be managed by different policies assigned based on their account names. For example, devices can be connected automatically with each other when they share the same account name, or belong to the same group. Thus, a remote device can act as a monitoring or tracking device without server or human intervention. For example, video or audio communication can be established between two automatically connected devices associated with the same account. In some implementations, different devices can be assigned different policies for their interconnectivity. Within the same account, devices can be distinguished by assigning a device identifier to each device. The device identifier can be defined and assigned to uniquely identify the device within the same account name. This allows management of multiple IoT devices through a single account with different device names.

In addition to IoT functions, an account can also include social networking functions, thus unifying the IoT network with social network functionalities in the same interface.

Certain regulation and permission process can be implemented for connecting devices associated with different account names. For example, additional control mechanisms, such as a request and approval process, can be used to add a device to another device's "friend" list.

In some implementations, devices associated with different account names and devices associated with the same account name can be classified into two groups. The groupings can also be based on other criteria, and can include a mix of people and things. For example, one group can include devices and individuals associated with a family, and another group can include devices and individuals who are friends. Different policies can be defined and applied for managing the IoT devices and their interconnectivity with other devices or individuals.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID), and can transmit information to one or more other devices over a wired or wireless connection. An IoT device may have a passive communication interface, such as a quick response (QR) code, radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function) that can be embedded in, controlled, or monitored by a central processing unit (CPU), microprocessor, ASIC, or the like.

For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc.

An IoT device can be configured for connection to an IoT network such as a local ad-hoc network or the Internet. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers).

FIG. 1 illustrates device 104, which is attempting to initiate authentication (i.e., logging on) with server 106 connected to IoT network 108. Device 104 may optionally be connected to network 102, which may be the Internet, a private network, a public network, a social network and/or another IoT network. Network 102 may also include other devices that may have the same account name. For example, device 104 can be associated with a device identifier ("000001") and an account name ("Green"). Each device identifier is associated with at least one device. The server 106 controls access to IoT network 108 and authenticates device 104 via the account name associated with the device ("Green"). IoT network 108, as depicted, is connected to devices 110 and 112 but may also be connected to the Internet, a private network, a public network, a social network, other IoT networks, and/or other devices. Devices 110 and 112 are not connected because device 112 has a different account name ("Red") than device 110 ("Green") and thus belongs to a different group. Although device 110 has the same account name as device 104 and hence can belong to the same group, the device identifiers of devices 104 and 110 are different and hence exclusive to each device. Those of skill in the art will appreciate that devices which have the same account name are a special case of devices which belong to the same group.

Networks 102 and 108 may include wired or wireless network devices that enable communication such as routers, switches relays, or server, or be connected to such devices. In some implementations, networks 102 and 108 may include a cloud of computers. In other implementations, networks are local area networks, IoT networks or machine to machine networks. Accordingly, in some implementations, devices connected to networks 102 and 108 and to each other may be able to communicate autonomously via machine to machine technology.

Figure 2:
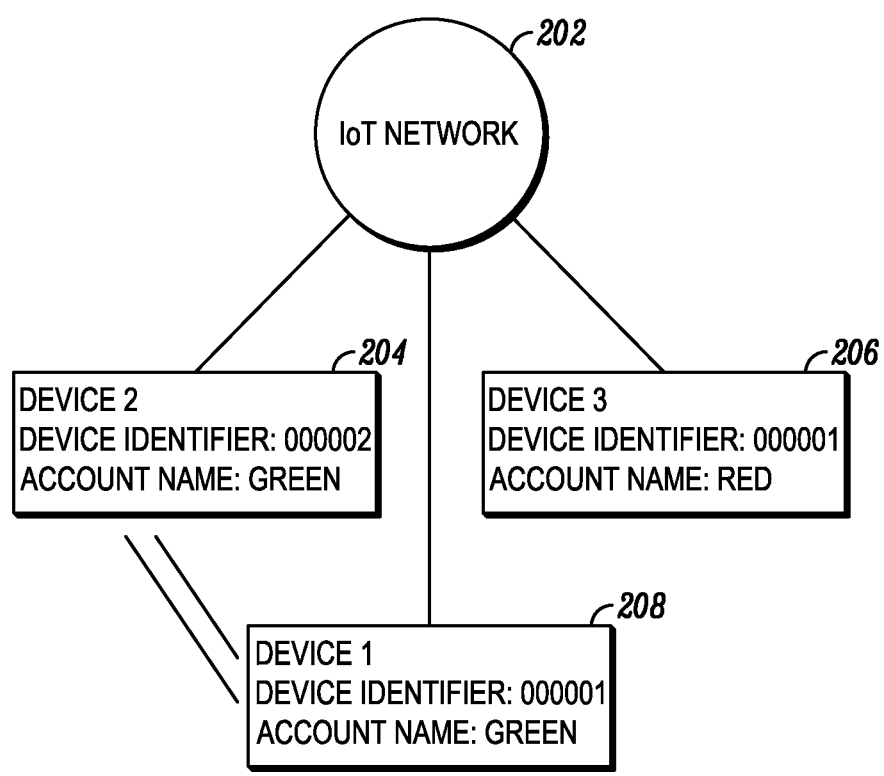
FIG. 2 illustrates an IoT network 202 in which device 204 is connected to device 208 according to an implementation.

FIG. 2 illustrates an IoT network 202 where device 204 is connected to device 208 which has the same account name. Here device 208 has been authenticated by a server (not shown) and connected to device 204 because devices 204 and 208 have the same account name and thus belong to the same group. Devices 204 and 208 are connected to each other but not to device 206 because device 206 has a different account name and thus belongs to a different group. In some implementations, devices 204 and 208 are automatically connected by machine to machine technology. In other implementations, devices 204 and 208 are automatically connected by a machine other than a server. Here, connection enables simple management and information exchange between devices 204 and 208 through the account name ("Green"). As illustrated in FIG. 2, the same account name ("Green") is logged on to the server on multiples devices (e.g., 204 and 208) which are distinguished by device identifiers (e.g., "000001" and "000002").

Figure 3:
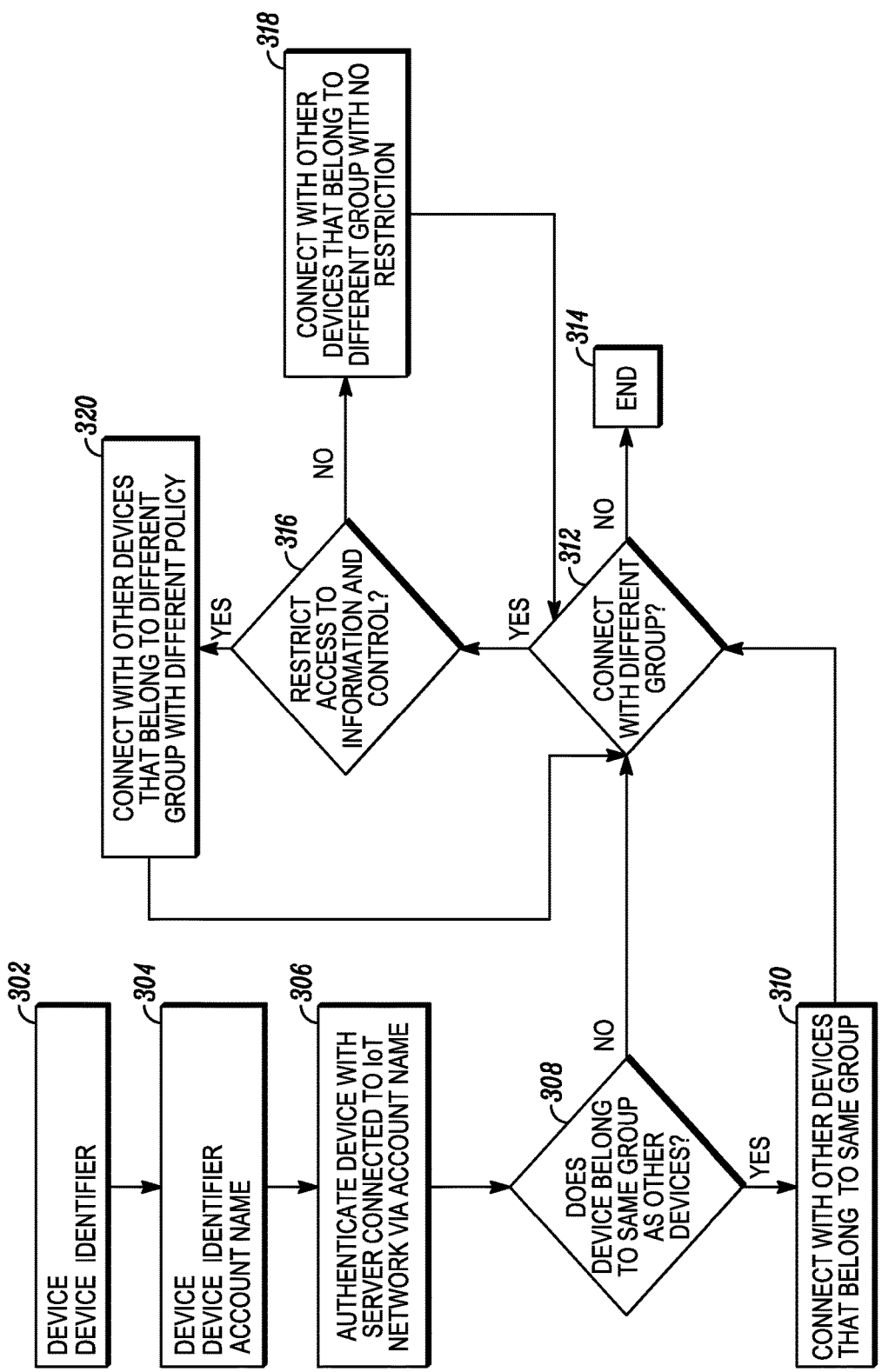
FIG. 3 is a flow chart which describes a method of connecting devices in an IoT network according to an implementation.

FIG. 3 is a flow chart which describes a method of connecting devices which belong to the same group and, if desired, with devices which belong to different groups in an IoT network. A device with a device identifier is shown at 302. An account name is associated with the device identifier at 304 via a communication protocol with, for example, a server. The account name may be, for example, any user account, email address, phone number or unique string within a server. In some implementations, the device identifier is associated with the account name by a resource field in a XMPP protocol. In other implementations, each device identifier is a Uniform Resource Identifier. In still other implementations, each device is associated with at least one unique device identifier for each account name. In some of the above implementations, an additional identification marker is associated with the device identifier and the account name by the resource field. For example, the additional identification marker may signify the device type and/or application version number.

At 306, the device is authenticated by account name and device identifier, by, for example, a server associated with the IoT network and the device is then logged into the IoT network. At decision branch 308, the account name of the device is compared to account names of other devices. If the account name of the device and the account name of another device belong to the same group, then the devices are connected for management and information exchange at 310. In some implementations, determining whether the account name of the device and the account name of another device belong to the same group requires determining whether the first account name and the second account name are the same. In other implementations, device connection takes place without either server or human intervention. In still other implementations, device connection is prompted by a machine other than the server. In still other implementations, device connection takes place through machine to machine communication. In still other implementations, devices are connected via spontaneous video or audio communication.

If the account name associated with the device authenticated by the server at 306 belongs to a different group than account names of other devices in the IoT network at 308, then a request and approval process, which uses either server or human intervention, can be initiated at 312 to connect devices associated with different groups. Similarly, devices connected at 310 may also connect with devices that belong to different groups by initiating a request and approval process at 312. If connection of devices which belong to different groups is not desired or is not approved, then the process terminates at 314.

If connection with devices which belong to different groups is approved, then the process advances to 316 where a decision is made whether to restrict access to information and control. In some implementations, different policies may be automatically assigned for connecting devices which belong to different groups. In other implementations, policies may be assigned by human or server intervention for connecting devices which belong to different groups. If restricted access is desired, then at 320, connection of devices which belong to different groups is done with different policies for management and/or sharing information between the different groups. Thus, devices logged into the server which belong to the same group may have different policies for control and connectivity with devices logged into the server which belong to a different group. If identical management and complete information sharing between devices logged into the server which belong to different groups is desired, then at 318, devices that belong to different groups are connected with identical policies. After completing steps 318 or 320, the process loops back to 312 until termination at 314.

In some implementations, if connection with devices with different account names is approved, the other device may be added to a "friends list", so that in the future the process will connect the devices at 308 with the proper restrictions, thus obviating the need to proceed through steps 316 or 320.

Figure 4:
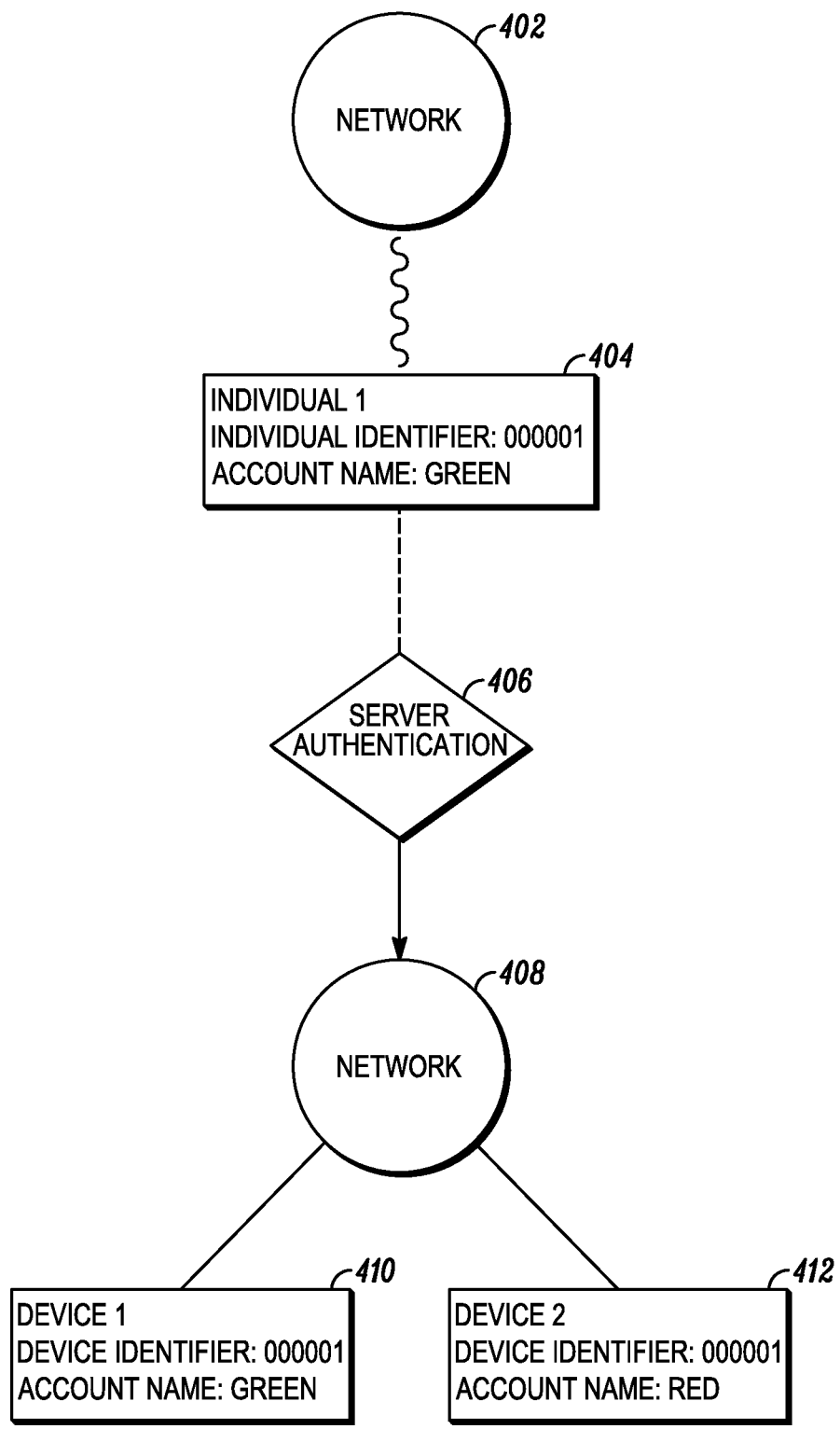
FIG. 4 illustrates an individual 404 attempting to initiate authentication with server 406 connected to network 408 according to an implementation.
Figure 5:
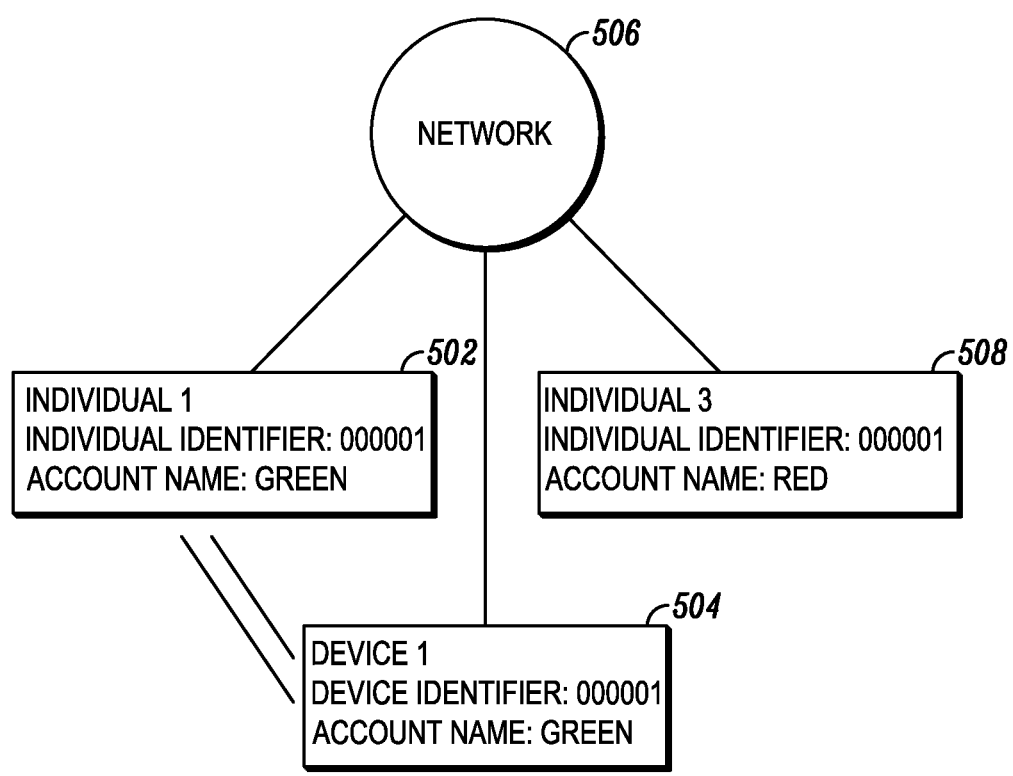
FIG. 5 illustrates a network 506 where devices and individuals are connected according to an implementation.
Figure 6:
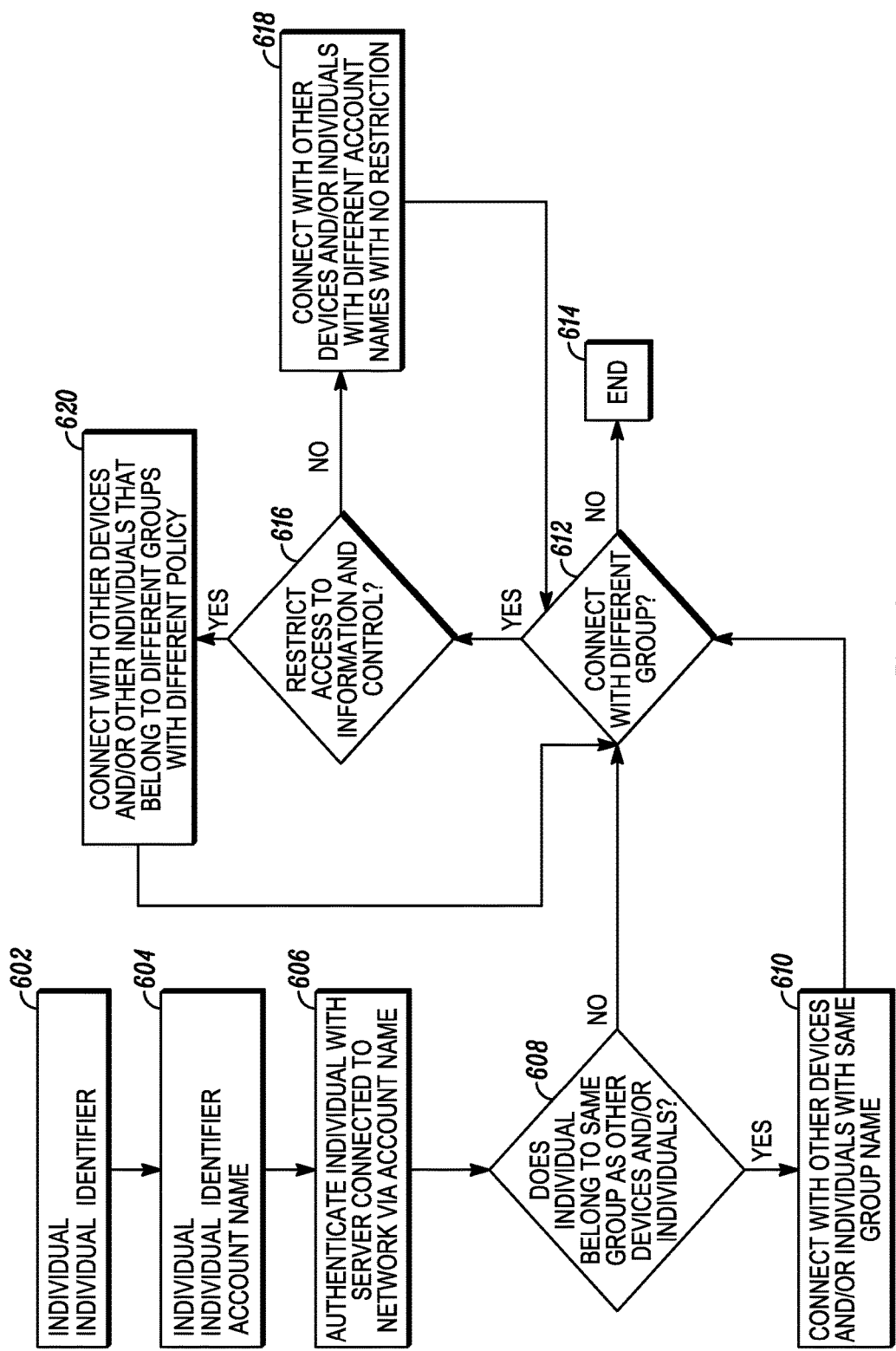
FIG. 6 is a flow chart which describes a method of connecting devices and individuals in a network according to an implementation.

Those of skill in the art will appreciate that the design implemented in FIG. 3 can be used in a network that includes only individuals and both individuals and devices. The skilled artisan will immediately recognize that the process illustrated in FIG. 3 can be used in a network of individuals (i.e., a social network) to facilitate information exchange and management control through the use of an account name (not illustrated). FIGS. 4, 5 and 6, infra, explicitly illustrate using the above design in a network of devices and individuals to facilitate information exchange and management control through the use of an account name.

FIG. 4 illustrates individual 404, who is attempting to initiate authentication (e.g., logging on) with server 406 connected to network 408 which is connected to devices 410 and 412. Individual 404 may optionally be connected to network 402 which may be the Internet, a private network, a public network, a social network, or another IoT network. Network 402 may also include other devices and/or other individuals which have the same or different account name and hence belong to the same or different groups. Individual 404 is associated with an individual identifier ("000001") and an account name ("Green"). Each individual identifier is associated with at least one individual and in some implementations the individual identifier is unique for each account name. The server 406 controls access to network 408 and respectively authenticates the individual 404 via the account name associated with the individual ("Green").

Network 408, as depicted, is connected to devices 410 and 412 but may also be connected to the Internet, a private network, a public network, a social network, other IoT networks, other devices or other individuals. Devices 410 and 412 are not connected because device 412 has a different account name ("Red") than device 410 ("Green") and hence belongs to a different group.

FIG. 5 illustrates a network 506 that includes devices and individuals. Device 504 and individual 502 have the same account name and are hence connected since can belong to the same group. Here individual 502 has been authenticated by a server (not shown) and connected to device 504 because the device and the individual belong to the same group. Device 504 and individual 502 are connected to each other but not to individual 508 because individual 508 belongs to a different group. In some implementations, device 504 and individual 502 are automatically connected by a machine other than a server. Here, connection enables simple management and information exchange between device 504 and individual 502 through the account name ("Green"). As illustrated in FIG. 5, the same account name ("Green") is logged on to the server on a device 504 and individual 502.

FIG. 6 explicitly illustrates a design that uses groups to distinguish between devices in an IoT network, as illustrated in FIG. 3, to distinguish between devices and individuals in a network that includes both individuals and devices. Accordingly, FIG. 6 is a flow chart that describes a method of connecting an individual and a device that have the same account name and belong to the same group with each other and, if desired, with devices which belong to different groups in a network which included both devices and individuals. An individual with an individual identifier is shown at 602. An account name is associated with the individual identifier at 604 via a communication protocol with, for example, a server. The account name may be, for example, any user account, email address, phone number or unique string within a server. In some implementations, the individual identifier is associated with the account name by a resource field in an XMPP protocol. In other implementations, each individual identifier is a Uniform Resource Identifier. In still other implementations, each individual is associated with at least one unique individual identifier for each account name. In some of the above implementations, an additional identification marker is associated with the device identifier and the account name by the resource field. For example, the additional identification marker may signify the device type and/or application version number.

At 606, the individual is authenticated by account name and individual identifier, by, for example, a server associated with the network and the device is then logged into the network. At decision branch 608, the account name of the individual is compared to account names of other devices or individuals. If the account name of the individual and the account name of the device and/or the account name of another individual belong to the same group, then the individual and device and/or individual are connected for management and information exchange at 610. In some implementations, determining whether the account name of the individual and the account name of a device and/or an individual belong to the same group requires determining whether the first account name and the second account name are the same. In other implementations, device connection takes place without either server or human intervention. In still other implementations, connection is prompted by a machine other than the server. In still other implementation are spontaneous video or audio communication is used to connect the individual with a device and/or other individual.

If the account name associated with the individual authenticated by the server at 606 belongs to a different group than account names of other devices and/or other individuals in the network at 608, then a request and approval process, which uses either server or human intervention can be initiated at 612 to connect individuals with devices and/or individuals associated with different groups. Similarly, individual connected at 610 with other devices and/or individuals may also connect with devices and/or individuals that belong to different groups by initiating a request and approval process at 612. If connection of individuals with devices and/or individuals which belong to different groups is not desired or is not approved, then the process terminates at 614.

If connection with individuals with devices and/or individuals that belong to different groups is approved, then the process advances to 616 where a decision is made whether to restrict access to information and control. In some implementations, different policies may be automatically assigned for connecting individuals with devices and/or individuals that belong to different groups. In other implementations, policies may be assigned by human or server intervention for connecting individuals with devices and/or individuals that belong to different groups. If restricted access is desired, then at 618, connection of individuals with devices and/or individuals that belong to different groups is done with different policies for management and/or sharing information between the different groups. Thus, individuals logged into the server that belong to the same group may have different policies for control and connectivity with devices and/or individuals that belong to different groups. If identical management and complete information sharing between individuals logged into the server with devices and/or individuals who belong to different groups is desired, then at 620, individuals and/or devices that belong to different groups are connected to the individual with identical policies. After completing steps 618 and 620, the process loops back to 616 until termination at 614.

The skilled artisan will appreciate that the implementation illustrated in FIG. 6 could be adapted to connect other devices and/or individuals to a network which includes both devices and/or networks.

In some implementations, if connection with devices with different account names is approved, the other device may be added to a "friends list", so that in the future the process will connect the devices at 608 with the proper restrictions, thus obviating the need to proceed through steps 616 or 620.

Many aspects described herein are in terms of sequences of actions to be performed by, for example, elements of a computing device. It will be recognized that various actions described herein can be performed by specific circuits, e.g., an application specific integrated circuit (ASIC), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Thus, the various aspects of the disclosure may be embodied in a number of different forms, all of which have been contemplated to be within the scope of the claimed subject matter. Although the invention was described in connection with specific implementations, it should be understood that the invention as claimed should not be unduly limited to such specific implementations. Indeed, various modifications of the described modes for carrying out the invention which are obvious to those skilled in the art are intended to be within the scope of the appended claims.

I claim:

1. A method for unifying an Internet of Things (IoT) network and a social network of individuals, comprising:

associating, by a server associated with the IoT network and the social network, a first device identifier of a first device with a first account name and a second device identifier of a second device with a second account name, the first account name and the second account name each being associated with the IoT network and the social network, the first device identifier corresponding only with the first account name and the second device identifier corresponding only with the second account name;

authenticating, by the server, the first device using the first account name and the first device identifier and the second device using the second account name and the second device identifier;

determining whether the first account name and the second account name are the same;

determining whether the first account name and the second account name belong to a first group;

in response to determining that the first account name and the second account name are the same and in response to determining that the first account name and the second account name belong to the first group,
connecting the first device and the second device to each other, and
assigning a first policy for managing the first device and the second device;

in response determining that the first account name and the second account name are different and in response to determining that the first account name belongs to the first group and the second account name belongs to a second group, assigning a second policy for connecting the first device to the second device, the second policy being different than the first policy;

associating an identifier of an individual with a third account name and authenticating the individual, via a server of the social network, using the third account name and the identifier;

determining whether the third account name belongs to a same group associated with at least one of the first device or the second device; and in response to determining that the third account name belongs to the same group associated with the at least one of the first device or the second device, connecting the individual to the respective at least one of the first device or the second device.

2. The method of claim 1, wherein connecting the first device and the second device to each other further comprises:

automatically connecting the first device to the second device without any of server intervention and human intervention.

3. The method of claim 2, wherein automatically connecting the first device to the second device without any of server intervention and human intervention further comprises:

automatically connecting the first device to the second device by any of spontaneous video and audio communication.

4. The method of claim 1, wherein the second policy for connecting the first device to the second device further comprises:

connecting the first device to the second device using a request and approval process.

5. The method of claim 1, wherein each of the first account name and the second account name comprises any of an email address, a phone number, or a unique string associated with at least one server.

6. The method of claim 1, wherein the first device identifier of the first device is unique among device identifiers associated with the first account name, and the second device identifier of the second device is unique among device identifiers associated with the second account name.

7. The method of claim 1, wherein each of the first device identifier and the second device identifier is a Uniform Resource Identifier (URI) and respectively associated with the first account name and the second account name by a resource field in an XMPP protocol, the resource field comprising an additional identification marker that is indicative of any of a device type and an application version number.

8. The method of claim 1, wherein the IoT network is connected to the social network.

9. The method of claim 1, wherein the IoT network and the social network use the same interface.

10. The method of claim 1, wherein the first group comprises devices and individuals connected to the IoT network and the social network.

11. The method of claim 10, wherein a device or individual of the first group uses a same account name for the IoT network and the social network.

12. The method of claim 4, further comprising:

in response to the first device and the second device being connected using the request and approval process, adding the second device to a first friend list of the first device, wherein devices in the first friend list are capable of being connected to the first device with predetermined restrictions without the request and approval process.

13. A system for unifying an Internet of Things (IoT) network and a social network of individuals, comprising:

a first device with a first device identifier associated with a first account name;

a second device with a second device identifier associated with a second account name, the first account name and the second account name each being associated with the IoT network and the social network, the first device identifier corresponding only with the first account name and the second device identifier corresponding only with the second account name; and a server associated with the IoT network and the social network, wherein the server is configured to:

authenticate the first device using the first account name and the first device identifier and the second device using the second account name and the second device identifier;

determine whether the first account name and the second account name are the same;

determine whether the first account name and the second account name belong to a first group, wherein the first group comprises devices and individuals connected to the IoT network and the social network;

in response to determining that the first account name and the second account name are the same and in response to determining that the first account name and the second account name belong to the first group, connect the first device and the second device to each other, and assign a first policy for managing the first device and the second device;

in response to determining that the first account name and the second account name are different and in response to determining that the first account name belongs to the first group and the second account name belongs to a second group, assigning a second policy for connecting the first device to the second device, the second policy being different than the first policy;

associate an identifier of an individual with a third account name and authenticate, via a server of the social network, the individual using the third account name and the identifier;

determine whether the third account name belongs to a same group associated with at least one of the first device or the second device; and in response to determining that the third account name belongs to the same group associated with the at least one of the first device or the second device, connect the individual to the respective at least one of the first device or the second device.

14. The method of claim 4, wherein connecting the first device to the second device using the request and approval process further comprises:

determining whether restricted access is desired between the first device and the second device;

in response to determining that restricted access is desired between the first device and the second device, assigning a third policy for connecting the first device to the second device; and in response to determining that the restricted access is not desired between the first device and the second device, assigning a fourth policy for connecting the first device to the second device.

15. The system of claim 13, wherein the server is further configured to:
in response to determining that the first account name and the second account name belong to the first group, automatically connect the first device to the second device without any of server intervention and human intervention using the first policy.

16. The system of claim 13, wherein the second policy for connecting the first device to the second device further comprises:
connecting the first device to the second device using a request and approval process.

17. A non-transitory computer-readable medium storing a set of instructions which when executed by a computer system using a processor become operational with the processor for unifying an Internet of Things (IoT) network and a social network of individuals, the non-transitory computer-readable medium comprising instructions to:
associate a first device identifier of the first device with a first account name and a second device identifier of the second device with a second account name, the first account name and the second account name each being associated with the IoT network and the social network, the first device identifier corresponding only with the first account name and the second device identifier corresponding only with the second account name, the IoT network and the social network each using the same interface;
authenticate the first device using the first account name and the first device identifier and the second device using the second account name and the second device identifier;
determine whether the first account name and the second account name are the same;
determine whether the first account name and the second account name belong to a first group;
in response to determining that the first account name and the second account name are the same and in response to determining that the first account name and the second account name belong to the first group,
connect the first device and the second device to each other, and
assign a first policy for managing the first device and the second device;
in response to determining that the first account name and the second account name are different and in response to determining that the first account name and the second account name belong to different groups, assign a second policy for connecting the first device to the second device, the second policy being different than the first policy;
associate an identifier of an individual with a third account name;
authenticate, via a server of the social network, the individual using the third account name and the identifier;
determine whether the individual belongs to a same group as any of the first device and the second device, the first device and the second device belonging to different groups; and
in response to determining that the third account name and the first account name belong to the same group, connect the individual to the first device and assign a first policy for managing the first device and the individual.

18. The non-transitory computer-readable medium of claim 17, further comprising instructions to:
in response to determining that the third account name and the second account name belong to the same group, connect the individual to the second device and assign a second policy for managing the second device and the individual.

* * * * *